United States Patent
Boriskin et al.

(10) Patent No.: US 9,562,974 B2
(45) Date of Patent: Feb. 7, 2017

(54) MULTIPLE CONTENT MESSAGE BASE-ROVER ARCHITECTURE

(71) Applicant: Trimble Navigation Limited, Sunnyvale, CA (US)

(72) Inventors: Alexey D. Boriskin, Moscow (RU);
Dmitry V. Ivanov, Moscow (RU);
Dmitry G. Kozlov, Moscow (RU);
Gleb A. Zyryanov, Moscow (RU)

(73) Assignee: Trimble Inc., Sunnyvale, CA (US)

( * ) Notice: Subject to any disclaimer, the term of this patent is extended or adjusted under 35 U.S.C. 154(b) by 424 days.

(21) Appl. No.: 14/287,027

(22) Filed: May 24, 2014

(65) Prior Publication Data
US 2015/0338520 A1 Nov. 26, 2015

(51) Int. Cl.
| | |
|---|---|
| *G01S 19/13* | (2010.01) |
| *G01S 19/04* | (2010.01) |
| *G01S 19/09* | (2010.01) |
| G01S 19/41 | (2010.01) |
| G01S 19/43 | (2010.01) |

(52) U.S. Cl.
CPC ............ *G01S 19/13* (2013.01); *G01S 19/04* (2013.01); *G01S 19/09* (2013.01); *G01S 19/41* (2013.01); *G01S 19/43* (2013.01)

(58) Field of Classification Search
CPC .......... G01S 19/04; G01S 19/13; G01S 19/09; G01S 19/41; G01S 19/43
USPC .................................................... 342/357.51
See application file for complete search history.

(56) References Cited

U.S. PATENT DOCUMENTS

| | | |
|---|---|---|
| 6,925,088 B1 | 8/2005 | Moreaux |
| 6,965,816 B2 | 11/2005 | Walker |
| 7,064,706 B2 | 6/2006 | King et al. |
| 7,689,230 B2 | 3/2010 | Spadafora et al. |
| 7,737,887 B2 | 6/2010 | Remondi |
| 7,737,888 B2 | 6/2010 | Remondi |
| 8,085,904 B2 | 12/2011 | Pinault et al. |
| 8,111,665 B2 | 2/2012 | Brunel et al. |
| 8,200,430 B2 | 6/2012 | Trautenberg et al. |
| 8,264,404 B2 | 9/2012 | Remondi et al. |
| 8,532,678 B2 | 9/2013 | Geelen |
| 8,538,391 B2 | 9/2013 | Geelen |
| 8,600,403 B2 | 12/2013 | Edge |
| 8,618,978 B2 | 12/2013 | Torimoto et al. |
| 8,629,844 B2 | 1/2014 | Son et al. |
| 8,982,716 B2 * | 3/2015 | Wirola .................... G01S 19/05 370/252 |
| 2005/0110676 A1 * | 5/2005 | Heppe ..................... G01S 19/04 342/357.34 |
| 2013/0053034 A1 * | 2/2013 | Lee .......................... H04W 4/02 455/436 |

* cited by examiner

*Primary Examiner* — Harry Liu
(74) *Attorney, Agent, or Firm* — Kilpatrick Townsend & Stockton LLP

(57) ABSTRACT

A multiple content message (MCM) base apparatus configured to generate a composite base data stream is proposed. A multiple content message (MCM) rover apparatus configured to generate a set of fast frequency baseline data is proposed.

22 Claims, 3 Drawing Sheets

Multiple Content Message Rover Apparatus

Fig. 2

MULTIPLE CONTENT MESSAGE BASE-ROVER ARCHITECTURE

TECHNICAL FIELD

The technology relates to the field of satellite navigation, and more specifically to the field of using a multiple content message based navigation system capable of utilizing multitude of Global Navigation Satellite Systems (GNSS) and their signals.

BACKGROUND

Different Global Navigation Satellite Systems (GNSS) are widely available nowadays for a user. Most professional receivers generate observation data for a multitude of GNSS and their signals. These observable are presented in proprietary formats, so compatibility between different vendors can be achieved only through Receiver Independent Exchange Format (RINEX) conversion. However, even the latest version of the RINEX-3 conversion does not support effective real time operations.

What is needed is to utilize a Multiple Signal Message (MSM) RTCM-3 concept (and respective format) to present all GNSS observation data in such generic form that supports both a real time and a post processing navigation systems.

SUMMARY

This Summary is provided to introduce a selection of concepts that are further described below in the Detailed Description. This Summary is not intended to identify key or essential features of the claimed subject matter, nor is it intended to be used as an aid in determining the scope of the claimed subject matter.

A multiple content message (MCM) base apparatus mounted on a platform is proposed. The multiple content message (MCM) base apparatus comprises: a Global Navigation Satellite System (GNSS) sensor, a Position Velocity Time (PVT) Engine, and a Composite message generator. The Composite message generator is configured to generate a composite base data stream comprising two sets of data; a first set of data including a set of slow frequency observable data, and a second set of data including a set of fast frequency positioning data in the Integrated Velocity (IV) solution format. Those two sets of data are packed into a transport layer by using a packing protocol.

A multiple content message (MCM) rover apparatus mounted on a platform is proposed. The multiple content message (MCM) rover apparatus comprises: a Global Navigation Satellite System (GNSS) sensor, a Position Velocity Time (PVT) Engine, a Composite Message decoder, a Real Time Kinematic (RTK) engine, and a baseline corrector/combiner. The baseline corrector/combiner is configured to generate a set of fast frequency baseline data.

DESCRIPTION OF THE DRAWINGS

The accompanying drawings, which are incorporated in and form a part of this specification, illustrate embodiments of the technology and, together with the description, serve to explain the principles below.

DETAILED DESCRIPTION

Reference now is made in detail to the embodiments of the technology, examples of which are illustrated in the accompanying drawings. While the present technology will be described in conjunction with the various embodiments, it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific-details are set forth in order to provide a thorough understanding of the presented embodiments. However, it will be obvious to one of ordinary skill in the art that the presented embodiments may be practiced without these specific details. In other instances, well known methods, procedures, components, and circuits have not been described in detail as not to unnecessarily obscure aspects of the presented embodiments.

Figure 1:
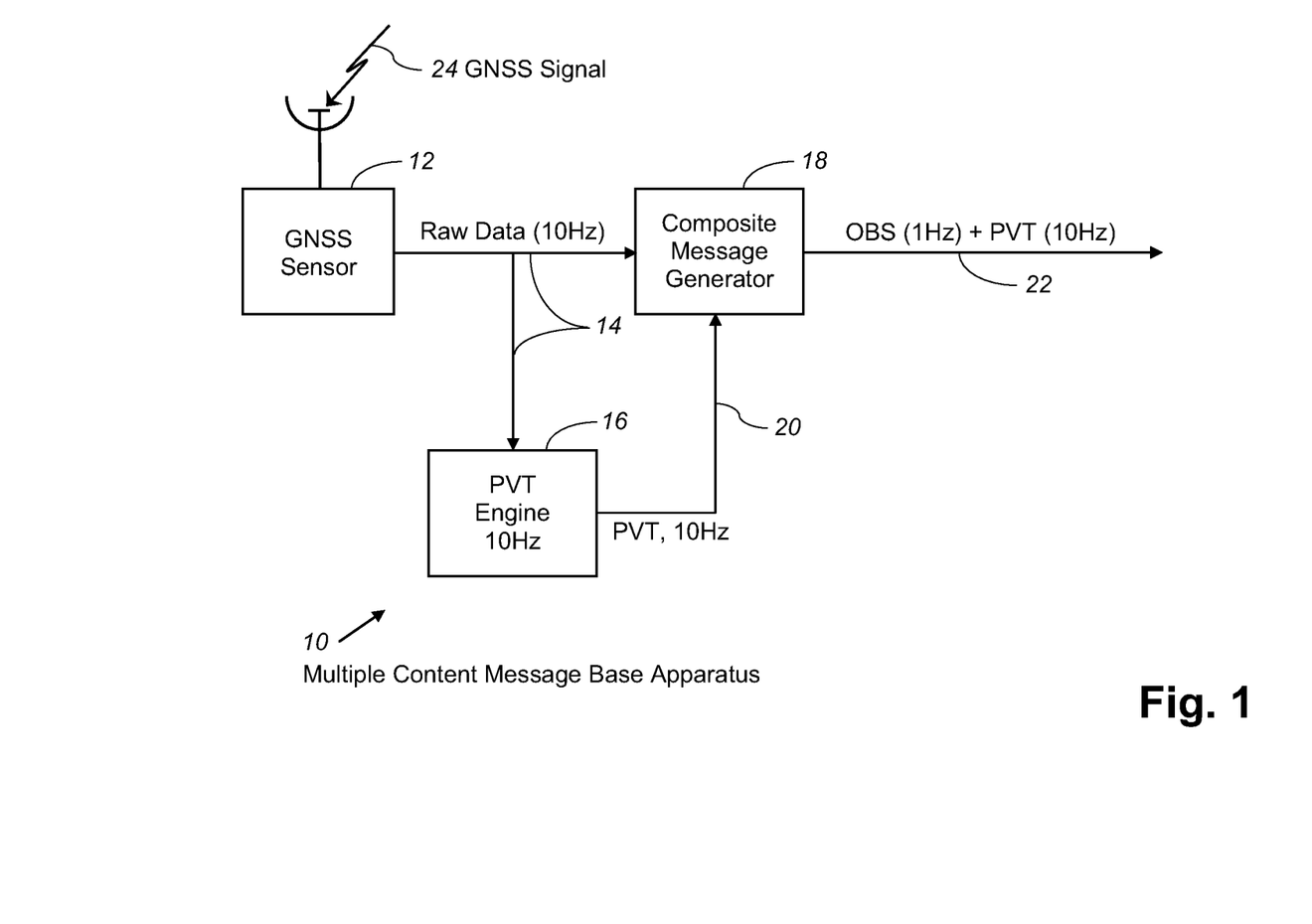
FIG. 1 illustrates a block diagram of a multiple content message (MCM) base apparatus for the purposes of the present technology.

In an embodiment of the present technology, FIG. 1 illustrates a block diagram 10 of a multiple content message (MCM) base apparatus.

In an embodiment of the present technology, the multiple content message (MCM) base apparatus comprises a Global Navigation Satellite System (GNSS) sensor 12 configured to acquire at least one GNSS signal 24 emanating from at least one visible GNSS satellite (not shown).

In an embodiment of the present technology, referring still to FIG. 1, the GNSS sensor 12 is configured to provide a set of original fast frequency raw data 14 obtained from at least one visible GNSS satellite (not shown).

In an embodiment of the present technology, the fast frequency of raw data $F_{fast}$ comprises 10 Hz.

In an embodiment of the present technology, the fast frequency of raw data $F_{fast}$ comprises 100 Hz.

In an embodiment of the present technology, the fast frequency of raw data comprises a frequency $F_{fast}$ in the range between 10 Hz and 100 Hz.

In an embodiment of the present technology, the Global Navigation Satellite System (GNSS) sensor 12 is selected from the group consisting of: a single GNSS sensor; a combination of two GNSS sensors (not shown); a combination of three GNSS sensors (not shown); a combination of four GNSS sensors (not shown); a combination of five GNSS sensors (not shown); and a combination of six GNSS sensors (not shown).

In an embodiment of the present technology, the Global Navigation Satellite System (GNSS) sensor 12 is selected from the group consisting of: a GPS sensor; a GLONASS sensors; a Galileo sensor; a BEIDOU sensor; a QZSS sensor; and a SBAS sensor.

The Global Positioning System (GPS) is a space-based satellite navigation system that provides location and time information in all weather conditions, anywhere on or near the Earth where there is an unobstructed line of sight to four or more GPS satellites. The system provides critical capabilities to military, civil and commercial users around the world. It is maintained by the United States government and is freely accessible to anyone with a GPS receiver. The GPS project was developed in 1973 to overcome the limitations of previous navigation systems, integrating ideas from several predecessors, including a number of classified engineering design studies from the 1960s. GPS was created and realized by the U.S. Department of Defense (DoD) and was originally run with 24 satellites. It became fully operational in 1995. Bradford Parkinson, Roger L. Easton, and Ivan A. Getting are credited with inventing it.

Advances in technology and new demands on the existing system have now led to efforts to modernize the GPS system and implement the next generation of GPS III satellites and Next Generation Operational Control System (OCX). Announcements from Vice President Al Gore and the White House in 1998 initiated these changes. In 2000, the U.S. Congress authorized the modernization effort, GPS III.

GLONASS is an acronym for "Global Navigation Satellite System", is a space-based satellite navigation system operated by the Russian Aerospace Defense Forces. It provides an alternative to Global Positioning System (GPS) and is the only alternative navigational system in operation with global coverage and of comparable precision.

Development of GLONASS began in the Soviet. Union in 1976. Beginning on 12 Oct. 1982, numerous rockets launches added satellites to the system until the constellation was completed in 1995. During the 2000s, under Vladimir Putin's presidency, the restoration of the system was made a top government priority and funding was substantially increased. GLONASS is the most expensive program of the Russian Federal Space Agency, consuming a third of its budget in 2010. By 2010, GLONASS had achieved 100% coverage of Russia's territory and in October 2011, the full orbital constellation of 24 satellites was restored, enabling full global coverage. The GLONASS satellites designs have undergone several upgrades, with the latest version being GLONASS-K.

Galileo is a global navigation satellite system (GNSS) currently being built by the European Union (EU) and European Space Agency (ESA). The £5 billion project is named after the Italian astronomer Galileo Galilei. One of the aims of Galileo is to provide a high-precision positioning system upon which European nations can rely, independently from the Russian GLONASS, US GPS, and Chinese Compass systems (see below), which can be disabled in times of war or conflict.

In operation Galileo will use two ground operations centers, near Munich in Germany and in Fucino in Italy. In December 2010 EU ministers in Brussels voted Prague in the Czech Republic as the headquarters of the Galileo project.
On 21 Oct. 2011 the first two of four operational satellites were launched to validate the system. The next two followed on 12 Oct. 2012, making it "possible to test Galileo end-to-end". Once this In-Orbit Validation (IOV) phase has been completed, additional satellites will be launched to reach Initial Operational Capability (IOC) around mid-decade. The first determination of a position relying on signals emitted only from Galileo satellites was achieved on 12 Mar. 2013. Full completion of the 30-satellite Galileo system (27 operational and three active spares) is expected by 2019.

The use of basic (low-precision) Galileo services will be free and open to everyone. The high-precision capabilities will be available for paying commercial users and for military use. Galileo is intended to provide horizontal and vertical position measurements within 1-meter precision, and better positioning services at high latitudes than other positioning systems.

As a further feature, Galileo will provide a unique global search and rescue (SAR) function. Satellites will be equipped with a transponder which will relay distress signals from the user's transmitter to the Rescue Co-ordination Center, which will then initiate the rescue operation. At the same time, the system will provide a signal to the users, informing them that their situation has been detected and that help is on the way. This latter feature is new and is considered a major upgrade compared to the existing GPS and GLONASS navigation systems, which do not provide feedback to the user. Tests in February 2014 found that for Galileo's search and rescue function, operating as part of the existing International Cospas-Sarsat Programme, 77% of simulated distress locations can be pinpointed within 2 km, and 95% within 5 km.

The BeiDou Navigation Satellite System (BDS) is a Chinese satellite navigation system. It consists of two separate satellite constellations a limited test system that has been operating since 2000, and a full-scale global navigation system that is currently under construction.

The first BeiDou system, officially called the BeiDou Satellite Navigation Experimental System and also known as BeiDou-1, consists of three satellites and offers limited coverage and applications. It has been offering navigation services, mainly for customers in China and neighboring regions, since 2000.

The second generation of the system, officially called the BeiDou Satellite Navigation System (BDS) and also known as COMPASS or BeiDou-2, will be a global satellite navigation system consisting of 35 satellites, and is under construction as of January 2013. It became operational in China in December 2011, with 10 satellites in use, and began offering services to customers in the Asia-Pacific region in December 2012. It is planned to begin serving global customers upon its completion in 2021).

Augmentation of a global navigation satellite system (GNSS) is a method of improving the navigation system's attributes, such as accuracy, reliability, and availability, through the integration of external information into the calculation process. There are many such systems in place and they are generally named or described based on how the GNSS sensor receives the external information. Some systems transmit additional information about sources of error (such as clock drift, ephemeris, or ionospheric delay), others provide direct measurements of how much the signal was off in the past, while a third group provide additional vehicle information to be integrated in the calculation process.

A satellite-based augmentation system (SBAS) is a system that supports wide-area or regional augmentation through the use of additional satellite-broadcast messages. Such systems are commonly composed of multiple ground stations, located at accurately-surveyed points. The ground stations take measurements of one or more of the GNSS satellites, the satellite signals, or other environmental factors which may impact the signal received by the users. Using these measurements, information messages are created and sent to one or more satellites for broadcast to the end users. SBAS is sometimes synonymous with WADGPS, wide-area DGPS.

There are various SBAS systems: (i) The Wide Area Augmentation System (WAAS), operated by the United States Federal Aviation Administration (FAA); (ii) The European Geostationary Navigation Overlay Service (EG-NOS), operated by the European Space Agency; (iii) The Multi-functional Satellite Augmentation System (MSAS) system, operated by Japan's Ministry of Land, Infrastructure and Transport Japan Civil Aviation Bureau (JCAB); (iv) The Quasi-Zenith Satellite System (QZSS), proposed by Japan; (v) The GPS Aided Geo Augmented Navigation (GAGAN) system being operationalized by India; (vi) The GLONASS System for Differential Correction and Monitoring (SDCM), proposed by Russia; (vii) The Satellite Navigation Augmentation System (SNAS), proposed by China; (viii) The Wide Area GPS Enhancement (WAGE), operated by the United States Department: of Defense for use by military and authorized receivers; (ix) The commercial StarFire navigation system, operated by John Deere; and (x) The commercial Starfix DGPS System and OmniSTAR system, operated by Fugro;

The Quasi-Zenith Satellite System (QZSS) currently comprises a single satellite in an inclined geosynchronous orbit. The QZS-1 spacecraft is equipped with a primary L-band antenna (L-ANT) for transmission of the L1 CIA, L1C, L2C, L5, and L6 LEX signals, whereas a separate (LS-ANT) antenna is used for the L1 SAIF signal. In addition, a laser retro reflector array (LRA) is provided to enable precise distance measurements using satellite laser ranging.

In an embodiment of the present technology, referring still to FIG. 1, the Position Velocity Time (PVT) Engine 16 is configured to receive the set of original fast frequency raw data 14 provided by the GNSS sensor 12.

In an embodiment of the present technology, the Position Velocity Time (PVT) Engine 16 is configured to generate a set of fast frequency positioning data 21) in an Integrated Velocity (IV) solution format. IV is the same as Position Increment and shows the 3D change of antenna position between tags t1 and t2. This IV is not a difference between position estimates at t1 and t2 as this difference can be not accurate. On contrary IV can be very accurate. IV can be presented (and sent from base to rover as part of MCM) in different form. Cited below ATM,SUP,CPI/EPI messages contain IV as part ATOM format. In general ATM==ATOM.

In an embodiment of the present technology, the Position Velocity Time (PVT) Engine 16 is selected from the group consisting of: a standalone Position Velocity Time (PVT) Engine; and a differential Position Velocity Time (PVT) Engine (not shown).

In an embodiment of the present technology, the differential Position Velocity Time (PVT) Engine is selected from the group consisting of: a Measurement Space Corrected (MSC) Engine; and a State Space Corrected (SSC) Engine. Differential positioning is the process of correcting local receiver observables (or internal PVT engine states) using some data available from external sources. Correcting data are divided into two groups: Measurement Space (MS) corrections, and State Space (SS) corrections. MS corrections are numbers that are simply added to the respective local measurement to cancel (or at least reduce) some systematic errors. A typical example of MS corrections is either DGNSS corrections (e.g. RTCM MT 1,31) or RTK corrections (e.g. RTCM-3 MT 1004,1012). The primary attribute of MS corrections is the position (reference) they are tagged to. MS corrections usually serve a local area around the reference position. MS corrections can correspond to either a physical or virtual reference station. RTK network corrections (MAC, FKP) can be considered as augmentations of MS corrections to extend the area of applicability. SS corrections are the estimates of particular errors affecting GNSS observations. SS corrections include satellite orbit and clock corrections, ionosphere corrections, satellite signal bias estimates and some others. SS corrections are usually not tagged to any reference position, serve wider areas compared to MS corrections, but are not always global. For example the ionosphere correction grid can be available only for some continents, like WAAS ionosphere correction, which is available over the USA only. The typical example of SS corrections is SBAS and L-band. Unlike precise MS corrections, the current status of SS corrections does not allow receivers to determine centimeter level positions. But the latest progress with the so-called PPP (Precise Point Positioning) solutions using precise, almost real-time IGS products will lead to centimeter level accuracies in the future. Depending on the organization of the PVT engine, SS corrections can be applied differently. Ashtech receivers transform SS corrections into MS corrections (and associated accuracy figures) referring to the receiver's current position. The receiver then applies these MS corrections to receiver observations.

In an embodiment of the present technology, the Position Velocity Time (PVT) Engine 16 employs a base navigation algorithm comprising a real time base navigation algorithm.

In an embodiment of the present technology, the Position Velocity Time (PVT) Engine 16 employs a base navigation algorithm comprising a post-processing base navigation algorithm.

Example I

Base PVT Engine Algorithm

One possible (real time) base PVT engine algorithm (not shown) comprises at least the following steps:

(a) getting receiver raw observables (pseudo-range and carrier phase);

(b) processing Satellite navigation data to compute Satellite coordinates, time offsets, ionosphere error and some other parameters;

(c) correcting the receiver's observables by using the navigation data, whereas a priori receiver's position/velocity data are used as pre-fit residuals;

(d) optionally correcting the pre-fit residuals by using the external corrections, (e.g. by using the corrections extracted from a SBAS signal or from a decoded RTCM differential stream;

(e) making a priori assumptions about the receiver's Observations by setting weights for each observable;

(f) preparing so called a priori position state matrix, measurement weight matrix, observation design matrix;

(g) performing Least Mean Square (or Kalman Filter) adjustment of the chosen pre-fit residuals by using the prepared matrices to get a posteriori position/velocity estimates;

(h) computing an accurate Integrated Velocity (IV) solution as a part of a posteriori position/velocity solution; and (i) keeping the computed in step (h) position/velocity/IV estimate as a priori data for the next time epoch.

In an embodiment of the present technology, the Composite Message generator 18 is configured to receive the set of original fast frequency $F_{fast}$ raw data 14 provided by the GNSS sensor 12, and configured to receive the set of fast frequency positioning data $F_{fast}$ 20 in Integrated Velocity (IV) solution format provided by the PVT Engine 16.

In an embodiment of the present technology, the Composite Message generator 18 is further configured to generate a composite base data stream 22 comprising two sets of data; a first set of data including a set of slow frequency $F_{slow}$ of observable data, and a second set of data including a set of fast frequency $F_{fast}$ positioning data in the Integrated Velocity (IV) solution format.

In an embodiment of the present technology, the composite base data stream 22 is packed into a transport layer by using a packing protocol. Please, see discussion below.

In an embodiment of the present technology, the slow frequency $F_{slow}$ of observable data is decimated compared to the fast frequency $F_{fast}$ of observable data, and a second set of data including a set of fast frequency $F_{fast}$ of raw data.

Example II

If the fast frequency $F_{fast}$ is the range between 1 Hz and 100 Hz, than the slow frequency $F_{slow}$ is in the range between 0.1 Hz and 10 Hz.

In an embodiment of the present technology, the Composite Message Generator 18 (of FIG. 1) employs a packing protocol selected for the group consisting of: a Radio Technical Commission for Maritime Services (RTCM) protocol; a Compact Measurement Record (CMR) protocol; and an AshTech Optimized Messaging (ATOM) protocol. The performance of a Real-Time Kinematic (RTK) system is highly dependent on the data link component between reference (base) and rovers. Real-Time Kinematic positioning is widely used for many applications. The reference station broadcasts carrier phase and code phase measurements to one or more rover stations. The rover stations combine locally collected measurements with those from the reference station to obtain position results at a centimeter-level. Frequently the data link component of a Real-Time Kinematic system takes the form of digital radio/modems, however cellular phones or FM subcarrier signals on local radio stations may be used. In all data link mediums, the available data bandwidth is at a premium. The design of a data transmission standard must attempt to minimize the bandwidth. Real-Time Kinematic system manufacturers have adopted their own proprietary data transmission standards. Without a published standard, users cannot freely mix reference station and rover equipment from different manufacturers. The Radio Technical Commission for Maritime services, Special Committee 104 (RTCM-SC 104), convened to address the issue of a Real-Time Kinematic data transmission standard and presented a proposal for carrier phase and pseudorange messages, designated 18, 19, 20 and 21. Please, see RTCM Recommended Standards For Differential Navistar GPS Service V2.1, RTCM Paper 194-93/SC104-STD, Jan. 3, 1994. The Special Committee 104, (RTCMSC104), published message types 18-21 in their Version 2.1 standard, which support high-precision Real-Time Kinematic users. However, the RTCM messages have a large framing overhead and do not include significant data compression algorithms to make them practical for many data link options. As community reference station infrastructure is implemented, a compact transmission standard helps Real-Time Kinematic techniques gain favor with users who only wish to purchase a rover unit. A widely used Real-Time Kinematic data transmission standard is publicly disclosed for the first time so that it can be used by all manufacturers across the industry. The Compact Measurement Record (CMR) format contains packet framing and message types for raw L1 and L2 carrier phase and pseudorange data, plus reference station location and description messages. Details of the compact data transmission standard are documented. Issues relating to mixing different receiver types are raised; of particular concern are carrier phase and pseudorange biases and antenna phase center variations. With nine satellites in view, the new standard allows for dual-frequency carrier phase and pseudorange data to be transmitted once per second in less than 2000 bits. The Compact Measurement Record format requires half the bandwidth of the equivalent RTCM-SC104 messages.

There are several prevalent formats that are used to transmit GNSS data in real-time. In an embodiment of the present technology, the Composite Message Generator 18 is configured to use the AshTech Optimized Messaging (ATOM) format.

ATOM is a binary GNSS format developed by Ashtech. A distinguishing feature of the ATOM format is the various compression options which can be used to save bandwidth. The full format specifications can be found in the ATOM reference manual (ATOM, 2010), which can be obtained by request from Ashtech.

ATOM uses RTCM-3 message as a transport layer, which means that an ATOM message has the same message structure as an RTCM-3 message. Please see below.

The decision to use RTCM-3 as the transport layer for ATOM development was made to allow third party vendors to decode ATOM easily using standard RTCM-3 decoders. ATOM has several different message groups such as MES (observations), PVT (positions), NAV (navigation data) and others. The most flexible and powerful of these is the RNX (RiNeX) group.

RNX is designed to generate raw observations to allow effective and unambiguous conversion to RINEX-3. The variety of GNSS and their signals is almost unlimited in RNX messages, because it uses universal and flexible data identifications. The RNX messages can be customized from fully expanded to fully compact, allowing users to choose between message size and data availability. The RNX message group has sub-messages for raw observation data, as well as a sub-message for antenna position.

The ATOM compact messages have the minimum bandwidth out of all following formats: RTCM-3, RT-17 Novatel (RANGECMP), JPS, SBF ATOM (Compact), and ATOM (Standard). This is achieved by providing only the minimum information and by using various compression strategies.

On the other hand NovAtel, SBF and RT-17 consume the most amount of bandwidth by using the most comprehensive messages. JPS and ATOM standard messages require similar amount of bandwidth relative to the RTCM-3 standard.

Messages of the SUP (SUPplementary) group are configured to output a set of receiver information that supplements PVT, RNX (and possibly other ATOM) data for some GNSS applications. Usually the messages of given group are configured for specific users. There are also additional requirements to minimize message latency and size. The set of default ATOM SUP messages can be enabled/disabled using the following command: $PASHS,ATM,SUP, <Port Name>, ON/OFF.

The general organization of the SUP message is presented in Table I.

TABLE I

The general organization of SUP messages

| Data item | Bits | Data type | Offset | Scale | Range | Comments |
|---|---|---|---|---|---|---|
| START TRANSPORT | | | | | | |
| Transport Preamble | 8 | uint8 | 0 | | | Set to 0xD3 (HEX Code) |
| Reserved | 6 | Bit6 | 8 | | | Set to 000000 |
| Message Length | 10 | unt10 | 14 | | | Message length in bytes |
| MESSAGE HEADER | | | | | | |
| Message number | 12 | uint12 | 24 | | 1001-4095 | 4095 is reserved for Ashtech |
| Message sub-number | 4 | uint4 | 36 | | 0-15 | 1 is reserved for ATOM SUP messages |
| Version | 3 | uint3 | 40 | | 0-7 | ATOM version number, set to 1 |
| Reserved | 4 | uint4 | 43 | | 0-15 | Set to 0000 |
| SUP type | 9 | uint9 | 47 | | 0-511 | Specifies which SUP message follows |
| MESSAGE DATA | | | | | | |
| SUP data | | | | | | See sub-sections below |
| END TRANSPORT | | | | | | |
| CRC | 24 | uint24 | | | | 24-bit Cyclic Redundancy Check (CRC) |
| Total | | | | | | |

The currently supported SUP messages are presented in die Table II.

TABLE II

The Currently Supported SUP messages

| SUP message type | ASCII identifier | Attribute description | Comments | Counterpart |
|---|---|---|---|---|
| 1 | CPI | Compact Position Increment solution | To augment moving RTK base | N/A |
| 2 | EPI | Extended Position Increment solution | To support local area GIS jobs | N/A |

Messages CPI and EPI are actually actual ATOM messages to pack IV solution. Messages 1 and 2 generally do not include position estimates. Instead, they include accurate integrals of position increments between epochs. While (standalone) a position itself can have a few meters accuracy, a position increment can be very accurate, up to 1 mm error per second. There are some applications that utilize position increment technique in user applications by applying the Ashtech Position Increment Solution (APIS) technique that is fully described in the Ashtech ION-2009 paper. The Ashtech ION-2009 paper is incorporated herein in its entirety.

Messages 3 and 4 provide information similar to ATM, PVT,VEL block but without high overhead. Message 3 reports absolute velocity value and primary attributes, while Message 4 generates complete time tag and 3-D velocity components.

Referring still to FIG. 1, in an embodiment; of the present technology, the Composite Message generator 18 is further configured to output Position Increment Solution as estimated by the receiver PVT engine 16. The reported value does not generally allow obtaining the position information. But it allows computing very accurate position increment between any two time tags for which CPI message is available.

Referring still to FIG. 1, in an embodiment of the present technology, for time intervals less than 10 minutes, the Position Increment Solutions as estimated by the receiver PVT engine 16 have decimeter accuracy even though position itself has only a few meter accuracy.

On the other hand, for intervals less than about 10 seconds, the Position Increment Solutions as estimated by the receiver PVT engine 16 have centimeter accuracy. This feature allows one to use this message structure for a mobile RTK base.

In an embodiment of the present technology, the Composite Message Generator 18 is implemented by using a composite message generator algorithm.

Example III

Base Composite Message Generator Algorithm

One possible base Composite Message Generator algorithm (not shown) comprises at least the following steps:
(a) Preparing Ashtech observation correcting data as a message in the form of AshTech Optimized Messaging (ATOM) protocol, or RNX messages at 1 Hz rate;
(b) Preparing integrated velocity (I\) data in form of ATOM, SUP messages at 10 Hz rate;
(c) Sending the sequence of RNX and SUP messages to a receiver port or communication device (e.g. UHF radio).

In an embodiment of the present technology, the multiple content message (MCM) base apparatus 10 (of FIG. 1) is mounted on a platform (not shown). The platform is selected from the group consisting of: a mobile platform; and a stationary platform.

Figure 2:
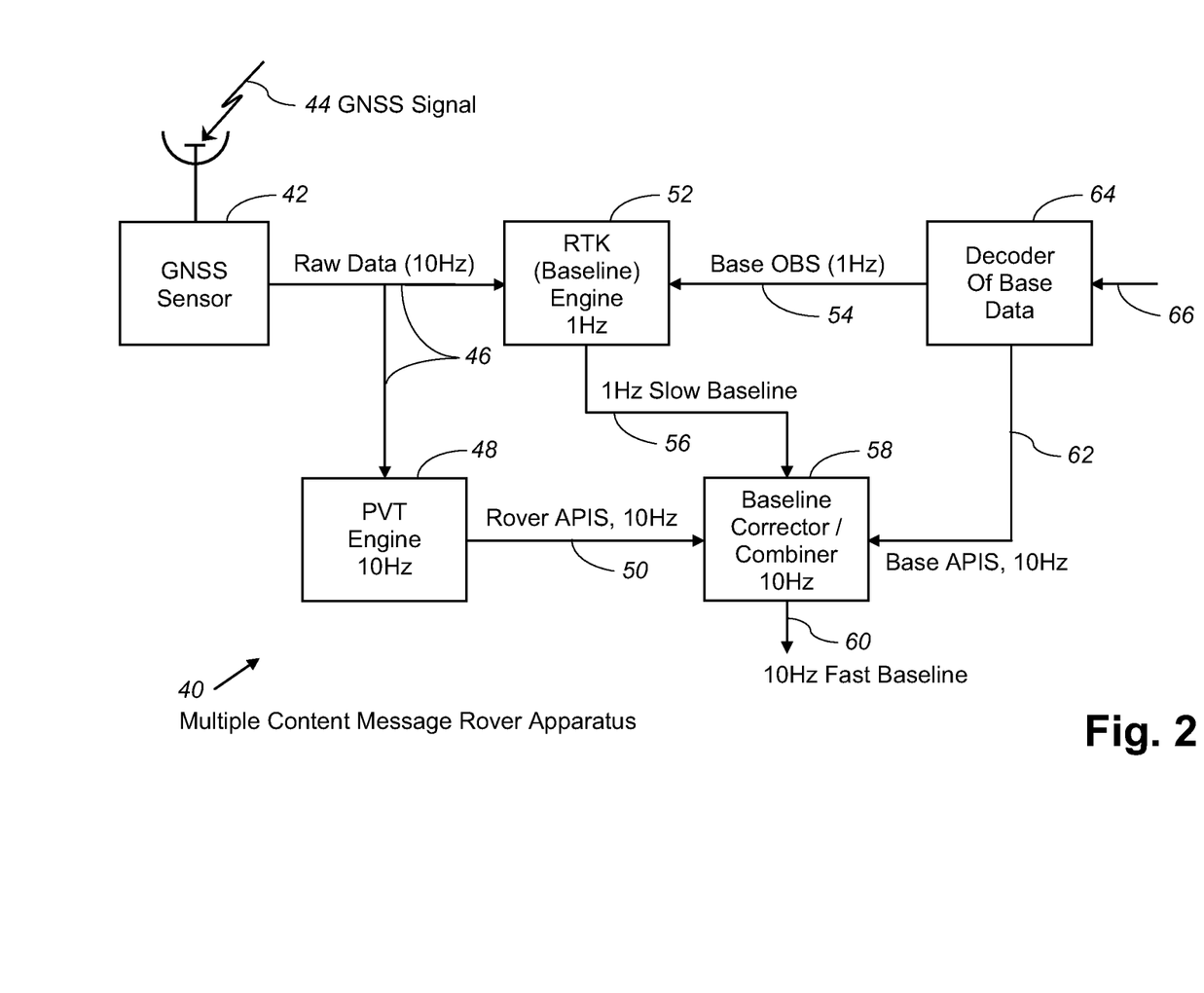
FIG. 2 shows a block diagram of a multiple content message (MCM) rover apparatus for the purposes of the present technology.

In an embodiment of the present technology, FIG. 2 shows a block diagram 40 of a multiple content message (MCM) rover apparatus mounted on a platform (not shown).

The platform is selected from the group consisting of: a mobile platform; and a stationary platform.

In an embodiment of the present technology, the multiple content message (MCM) rover apparatus 40 (of FIG. 2) comprises a Global Navigation Satellite System (GNSS) sensor 42 configured to acquire at least one GNSS signal 44 emanating from at least one visible GNSS satellite (not shown).

In an embodiment of the present technology, the Global Navigation Satellite System (GNSS) sensor 42 is configured to provide a set of original fast frequency raw data 46 obtained from at least one visible GNSS satellite (not shown).

In an embodiment of the present technology, the Global Navigation Satellite System (GNSS) sensor 42 is selected from the group consisting of: a single GNSS sensor; a combination of two GNSS sensors (not shown); a combination of three GNSS sensors (not shown); a combination of four GNSS sensors (not shown); a combination of five GNSS sensors (not shown); and a combination of six GNSS sensors (not shown).

In an embodiment of the present technology, the Global Navigation Satellite System (GNSS) sensor 42 is selected from the group consisting of: a GPS sensor; a GLONASS sensors; a Galileo sensor; a BEIDOU sensor; a QZSS sensor; and a SBAS sensor. Please, see discussion above.

In an embodiment of the present technology, the multiple content message (MCM) rover apparatus 40 (of FIG. 2) further comprises a Position Velocity Time (PVT) Engine 48 configured to receive a set of original fast frequency raw data 46 provided by the GNSS sensor 42.

In an embodiment of the present technology, the Position Velocity Time (PVT) Engine 48 is configured to generate a set of fast frequency positioning data 50 in an Integrated Velocity (IV) solution format.

In an embodiment of the present technology, the Position Velocity Time (PVT) Engine 48 is configured to generate a set of fast frequency positioning data 50 using Ashtech Position Increment Solution (APIS) technique.

In an embodiment of the present technology, the Position Velocity Time (PVT) Engine 48 is selected from the group consisting of: a standalone Position Velocity Time (PVT) Engine; and a differential Position Velocity Time (PVT) Engine (not shown).

In an embodiment of the present technology, the differential Position Velocity Time (PVT) Engine 48 is selected front the group consisting of: a MSC (Measurement Space Corrected) Engine (not shown); and a State Space Corrected (SSC) Engine (not shown).

In an embodiment of the present technology, the Position Velocity Time (PVT) Engine 48 employs a navigation rover algorithm (not shown) selected from the group consisting of: a real time rover navigation algorithm; and a post processing rover navigation algorithm.

In an embodiment of the present technology, the Position Velocity Time (PVT) rover Engine 48 employs a base navigation algorithm comprising a post-processing base navigation algorithm.

Example IV

Rover PVT Engine Algorithm

One possible post-processing rover MT engine algorithm (not shown) comprises at least the following steps:
(a) getting receiver raw observables (pseudo-range and carrier phase);
(b) processing Satellite navigation data to compute Satellite coordinates, time offsets, ionosphere error and some other parameters;
(c) correcting the receiver's observables by using the navigation data, whereas a priori receiver's position/velocity data are used as pre-fit residuals;
(d) optionally correcting the pre-fit residuals by using the external corrections,
(e.g. by using the corrections extracted from a SBAS signal or from a decoded RTCM differential stream;
(e) making a priori assumptions about the receiver's observations by setting weights for each observable;
(f) preparing so called a priori position state matrix, measurement weight matrix, observation design matrix;
(g) performing Least Mean Square (or Kalman Filter) adjustment of the chosen pre-fit residuals by using the prepared matrices to get a posteriori position/velocity estimates;
(h) computing an accurate Integrated Velocity (IV) solution as a part of a posteriori position/velocity solution;
and
(i) keeping the computed in step (h) position/velocity/TV estimate as a priori data for the next time epoch.

In an embodiment of the present technology, the multiple content message (MCM) rover apparatus 40 (of FIG. 2) further comprises a Composite Message decoder 64 of base data configured to receive from a multiple content message (MCM) base apparatus (10 of FIG. 1) a composite base data stream 66 and configured to recover from the received composite base data stream 66 a set of slow frequency observable data 54, and a set of fast frequency positioning data 62 in the Integrated Velocity (IV) solution format.

Example V

Composite Message Decoder Algorithm

One possible decoder algorithm for rover comprises at least the following steps:
(a) Assigning a decoder to listen to an upcoming port Composite Message (66 of FIG. 2);
(b) Detecting a transport layer (ATOM preamble and CRC) to establish Composite Messages frame synchronization;
(c) Splitting ATOM,RNX messages (1 Hz) and ATOM,SUP messages (10 Hz) into different streams;
(d) Sending ATOM,RNX messages to RTK (baseline) engine (52 of FIG. 2); and
(e) Sending ATOM, SUP messages to baseline corrector/combiner (58 of FIG. 2)

In an embodiment of the present technology, the multiple content message (MCM) rover apparatus 40 (of FIG. 2) further comprises a Real Time Kinematic (RTK) engine 52 configured to receive the set of fast frequency raw data 46 provided by the Global Navigation Satellite System (GNSS) sensor 42; configured to receive the set of slow frequency observable data 54 provided by the Composite Message decoder 64; and configured to generate a set of slow frequency baseline estimates data 56 with a matched slow frequency of the base data 66 and the slow frequency of the rover raw data 46. The baseline (not shown) comprises a line between the multiple signal message (MCM) rover apparatus (40 of FIG. 2) and a multiple signal message (MCM) base apparatus (10 of FIG. 1).

In an embodiment of the present technology, the Real Time Kinematic (RTK) engine 52 further comprises a high latency Real Time Kinematic (RTK) engine configured to compute a slow frequency baseline estimates with a high latency.

Example VI

Real Time Kinematic (RTK) Engine Algorithm

One possible RTK engine algorithm for rover comprises at least the following steps:
(a) Getting own (rover) receiver raw observables 46 (pseudo-range and carrier phase) at 1 Hz provided by GNSS sensor 42;
(b) Getting decoded ATOM,RNX correcting data 54 from Composite Message decoder 64 at 1 Hz;
(c) Computing ng all needed navigation data (GNSS orbits, clock corrections, ionosphere corrections, etc.);
(d) Computing Single Difference (SD) code and carrier pre-fit residuals by a priori position/baseline estimates; And
(e) Using standardized Kalman Filter update procedure to update a priori position with SD pre-fit residuals to compute a posteriori position/baseline estimate tagged to the integer second GNSS time.

In an embodiment of the present technology, the multiple content message (MCM) rover apparatus 40 (of FIG. 2) further comprises a baseline corrector/combiner 58 configured to combine the set of fast frequency rover data 50 in the Integrated Velocity (IV) solution format provided by the rover PVT engine 48; the set of slow frequency baseline data 56 provided by the RTK baseline engine 52, and the set of fast frequency positioning data 62 in the Integrated Velocity (IV) solution format provided by the decoder 64 of the base data 66. The baseline corrector/combiner 58 is configured to generate a set of fast frequency baseline data 60.

Example VII

Corrector/Combiner Algorithm

One possible corrector/combiner algorithm (rover) comprises at least the following steps:
(a) Buffering own (rover) and decoded (base) Integrated Velocity (IV) estimates on $\Delta T$ interval backward from current receiver time. Value of the interval $\Delta T$ should be guaranteed to be higher than the maximum possible delay in data link between the base and the rover receivers;
(b) Assigning T to be the time tag or last decoded Integrated Velocity (IV) estimates data from the base (from ATOM, SUP), and assigning $(T-\Delta T)$ to be the time tag of last decoded observables from the base (from ATOM,RNX);
(e) Taking the very last computed baseline estimate BL $(T-\Delta t)$ from the RTK engine tagged to time $(T-\Delta t)$ (from the rover RTK engine);
(f) Taking base Integrated Velocity (IV) estimates at time T {IVbase(T)} and base Integrated. Velocity (IV) estimates at time (T-t) {IVbase(T-$\Delta t$)} tagged to times T and (T-$\Delta t$) respectively (from the composite message decoder);
(e) Taking rover IV estimates at times T and T-$\Delta t$: {IVrover (T) and IVrover(T-$\Delta t$)} tagged to times T and (T-$\Delta t$) respectively (from the rover PVT engine);
and
(f) Computing final baseline estimate (tagged to time T) as BL(T)=BL(T-$\Delta t$)+(IVrover(T)-IVrover(T-$\Delta t$))-(IVbase (T)-IVbase(T-$\Delta t$)).

Figure 3:
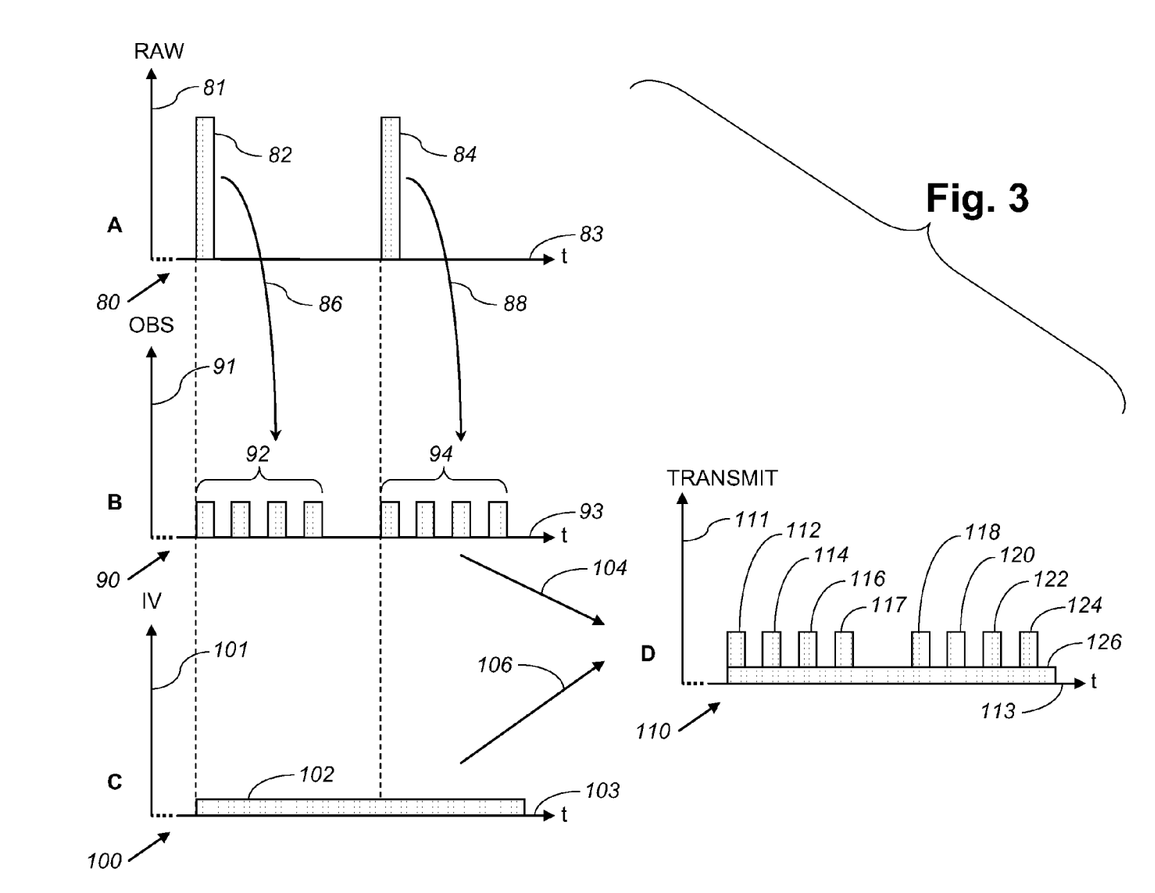
FIG. 3 depicts data packing for the raw data format (diagram A), for the OBS data format (diagram B), for the Integrated Velocity (IV) data format (diagram C), and for the transmit data format (diagram D) for the purposes of the present technology.

In an embodiment of the present technology, FIG. 3 illustrates the RAW data 80 (diagram A), OBS data 90 (diagram B), IV data 100 (diagram C), and Transmit data 110 (diagram D) provided by the Multiple Content Message Base apparatus 10 of FIG. 1.

In an embodiment of the present technology, FIG. 3 illustrates the RAW data 80 (diagram A: raw data 81 v. time 83) comprising two sets of Raw data 82 and 84 provided by the GNSS sensor 12 at two consecutive epochs.

In an embodiment of the present technology, FIG. 3 illustrates the slow frequency observable data (OBS data) 90 (diagram B: obs. data 91 v. time 93) comprising two sets of OBS data 92 and 94 provided by the Composite Message Generator 18 at two consecutive epochs.

In an embodiment of the present technology, FIG. 3 illustrates the second set of data including a set of fast frequency positioning data in the Integrated Velocity (IV) solution format 102 (diagram C: the fast frequency positioning data in the Integrated Velocity (IV) solution format 101 v. time 103).

In an embodiment of the present technology, FIG. 3 illustrates in the coordinate system (Transmit 111 v. time 113) the set of data 110 (diagram D) comprising the slow frequency observable data 112, 114, 116, 117, 118, 121), 122, and 124, and the set of fast frequency positioning data 126 in the Integrated Velocity (IV) solution format packed into a transport layer by using a packing protocol.

Referring still to FIG. 1, in an embodiment of the present technology, if the Multiple Composite Message Base apparatus 10 further comprises a Mobile RTK base apparatus, the Composite Message Generator 18 can generate 1 Hz OBS message 22 (e.g. in ATM, RNX message format), and augment these data by 10 Hz PVT data (in ATM, SUP, CPI message format).

ATOM is the wide set of binary messages where ATM, SUP,CPI is only one particular message among them. AshTech has developed its own proprietary binary data format, named "AshTech Optimized Messaging" ("ATOM" acronym for short), to adapt to the new GNSS reality and meet all user requirements. The name emphasizes the main distinguishing ATOM feature, which is its ability to present data in compact form. ATOM is open to further extensions with new messages or updates for already existing messages (the ATOM version number is provided for each message). Not all the ATOM fields need to be aligned by integer bytes boundaries. However, for extra convenience, some fields have been grouped together to fit the integer number of bytes.

The key features of ATOM include: Delivering the widest variety of GNSS data at any update rate; Supporting different customization options, from maximally compact to maximally full; Being in line with existing RTCM-3 and NMEA messages as well as RINEX-3 format; Backward compatibility with legacy Ashtech proprietary messages; Easily upgradeable to include new versions and/or new messages; Universal presentation form for different GNSS data; Capability to use ATOM for raw data recording and as a differential correction protocol.

ATOM can be used as the only GNSS data source for different applications. It can also be used in conjunction with existing including legacy) Ashtech proprietary and standardized data protocols.

In an embodiment of the present technology, wherein the Multiple Composite Message Base apparatus 10 comprises a Mobile RTK base apparatus, a rover using such a mobile base can run its RTK engine 52 (of FIG. 2) at 1 Hz. In addition, the rover is able to get 10 Hz baseline update by using a CPI message received from the base 10 and by using a copy of CPI message generated on the rover's own side.

Such an approach allows user to save data link bandwidth thus substantially reducing the amount of rover computations for many applications requiring accurate baseline estimation between moving receivers.

Example VIII

Configuration including Mobile RTK base apparatus and rover that runs its RTK engine at 1 Hz.
Output Logic: on time
Message binary size: 160 bits (20 bytes)
How to request? $PASHS,ATM,SUP, <Port Name>,ON,x, &CPI
Permissible intervals x (sec): 0.05/0.1/0.2/0.5/12/3/4/5/6/10/12/15/20/30/60/120 etc. each integer minute but less than 15 minutes, Referring to the message structure of Table III, this message structure is supposed to be a supplement to ATM, RNX or ATM,PVT. That is why the reported time tag and used datum correspond to the primary GNSS system specified in RNX and/or PVT messages. Possible rollovers in time tag and X/Y/Z should be repaired on decoding site. (X, Y, Z corresponds to position in Cartesian coordinates).

Referring to the message structure of Table III, it is configured to be very compact to fit low band data link. It is recommended to generate this message at sufficiently slow data rate (not faster than one message per second) to accommodate for the potential problems relating to the repair time and position rollovers associated with high dynamic applications and data link blockage.

Referring to the message structure of Table III, die reported X/Y/Z values can represent a true receiver's position modulo 1000 meters. If this is the case, the ambiguity,

TABLE III

Message structure and content corresponding to Example VIII.

| Data item | Bits | Data type | Offset | Scale | Range | Comments |
|---|---|---|---|---|---|---|
| START TRANSPORT | | | | | | |
| Transport Preamble | 8 | uint8 | 0 | | | Set to 0xD3 (HEX Code) |
| Reserved | 6 | bit6 | 8 | | | Set to 000000 |
| Message Length | 10 | unt10 | 14 | | | Message length in bytes, set to 14 |
| MESSAGE HEADER | | | | | | |
| Message number | 12 | uint12 | 24 | | 1001-4095 | 4095 is reserved for Ashtech |
| Message sub-number | 4 | uint4 | 36 | | 0-15 | 1 is reserved for ATOM SUP message |
| Version | 3 | uint3 | 40 | | 0-7 | ATOM version number, set to 1 |
| Reserved | 4 | uint4 | 43 | | 0-15 | Set to 0000 |
| SUP type | 9 | uint9 | 47 | | 0-511 | Set to 1 for this message |
| MESSAGE DATA | | | | | | |
| Position valid | 1 | bit1 | 56 | | 0-1 | 0: position is valid 1: only position increment is valid |
| Time tag | 11 | uint11 | 57 | 5 ms | 0-9.995 s | Time tag modulo 10 seconds Out of range value means invalid |
| Reserved | 2 | bit2 | 68 | | | Set to 00 |
| Cumulative counter of integral's resets | 6 | uint6 | 70 | | 0-63 | Incremented by 1 each time when position increment cannot be estimated accurately. Rolls to 0 when reaches 63 |
| X | 20 | uint20 | 76 | 1 mm | 0-999.999 m | Position X component modulo 1000 meters Out of range value means invalid |
| Y | 20 | uint20 | 96 | 1 mm | 0-999.999 m | Position Y component modulo 1000 meters Out of range value means invalid |
| Z | 20 | uint20 | 116 | 1 mm | 0-999.999 m | Position Z component modulo 1000 meters Out of range value means invalid |
| END TRANSPORT | | | | | | |
| CRC | 24 | uint24 | 136 | | | 24-bit Cyclic Redundancy Check (CRC) |
| Total | 160 | | | | | | if once resolved, will guarantee admissible position. On the other hand, even if the reported X/Y/Z values do not represent a true receiver's position, they can still be used to estimate position increment in time. Therefore, a corresponding bit is provided in the message of Table III. Message EPI is an extended variant of given CPI message.

Referring still to the message structure of Table III, with continuous tracking of (5+) Satellites, position increment integral is accurate and continuous. However, with the loss of tracking of the most of Satellites, position increment cannot be computed accurately. If this is the case, the integral is re-initialized and cumulative counter is incremented. However, the position increment is not accurate over the time interval wherein the cumulative counter changes. Here accurate means about 1 cm/sec or better.

An ATOM SUP Message can be used for Extended Position Increment Solution to supplement ATM,PVT message, that is to deliver an additional data to a field application, e.g. to have centimeter/decimeter relative accuracy for local area GIS jobs.

Example IX

ATOM SUP Message

Output Logic: on time

Message binary size: 240 bits (30 bytes)

How to request? $PASHS,ATM,SUP, <Port Name>,ON,x, &EPI

Permissible intervals x (sec): 0.05/0.1/0.2/0.5/1/2/3/4/5/6/ 10/12/15/20/30/60/120 etc. each integer minute but less than 15 minutes

TABLE IV

ATOM SUP Message structure and content

| Data item | Bits | Data type | Offset | Scale | Range | Comments |
|---|---|---|---|---|---|---|
| START TRANSPORT | | | | | | |
| Transport Preamble | 8 | uint8 | 0 | | | Set to 0xD3 (HEX Code) |
| Reserved | 6 | bit6 | 8 | | | Set to 000000 |
| Message Length | 10 | unt10 | 14 | | | Message length In bytes, set to 24 |
| MESSAGE HEADER | | | | | | |
| Message number | 12 | uint12 | 24 | | 1001-4095 | 4095 is reserved for Ashtech |
| Message sub-number | 4 | uint4 | 36 | | 0-15 | 1 is reserved for ATOM SUP message |
| Version | 3 | uint3 | 40 | | 0-7 | ATOM version number, set to 1 |
| Reserved | 4 | uint4 | 43 | | 0-15 | Set to 0000 |
| SUP type | 9 | uint9 | 47 | | 0-511 | Set to 2 for this message |
| MESSAGE DATA | | | | | | |
| Position valid | 1 | bit1 | 56 | | 0-1 | 0: position is valid 1: only position increment is valid |
| Position type | 4 | uint4 | 57 | | 0-15 | Like in ATM, PVT, COO |
| Primary GNSS system | 2 | uint2 | 61 | | | Like in PVT message |
| Time tag | 21 | bit21 | 63 | | | Like in PVT message |
| Reserved | 2 | bit2 | 84 | | | Set to 00 |
| Cumulative counter of integral's resets | 6 | uint6 | 86 | | 0-63 | Incremented by 1 each time when position increment cannot be estimated accurately. Rolls to 0 when reaches 63 |
| X | 38 | int38 | 92 | 0.1 mm | +/−13743895.3471 m | −13743895.3472 m if not defined or invalid |
| Y | 38 | int38 | 130 | 0.1 mm | +/−13743895.3471 m | −13743895.3472 m if not defined or invalid |
| Z | 38 | int38 | 168 | 0.1 mm | +/−13743895.3471 m | −13743895.3472 m if not defined or invalid |
| Reserved | 10 | bit10 | 206 | | | Set to 0 . . . 0 |

TABLE IV-continued

ATOM SUP Message structure and content

| Data item | Bits | Data type | Offset | Scale | Range | Comments |
|---|---|---|---|---|---|---|
| END TRANSPORT | | | | | | |
| CRC | 24 | uint24 | 216 | | | 24-bit Cyclic RedundancyCheck (CRC) |
| Total | 240 | | | | | |

Referring to Table IV, possible rollovers in X/Y/Z (if position valid=1) should be repaired on decoding site.

Referring still to Table IV, (X, Y, Z) correspond to Cartesian coordinates of a position expressed in default datum of primary GNSS system. Reported X/Y/Z values can represent true receiver position. On the other hand, if the reported X/Y/Z values do not represent the true receiver position, they can still be used to estimate position increment in time. Therefore, the corresponding bit is provided in the message.

Referring still to Table IV, with continuous tracking of at least (5+) Satellites, the position increment integral is accurate and continuous. Even with the loss of tracking of the most of Satellites, position increment can be computed accurately. If this is the case, the integral is re-initialized and cumulative counter is incremented, if cumulative counter does not change over the time period when the position increment is applied.

On the other hand, referring still to Table IV, if position is valid, then each X,Y,Z component is as accurate as indicated by position type flag. The absolute accuracy of this position is not degraded with incremented cumulative counter of integral's reset Example X Multiple Signal Messages (MSM) is simplified copies of ATOM RNX messages. GNSS RTK Standard Precision operation Observations (GNSS) are described by Multiple signal messages (MSM). MSM1, MSM2, MSM 3, and MSM4 are different formats for different GNSS satellite constellations. For some applications (e.g. RTK with the mobile base) reference data at 10 Hz rate can be required. In most cases, the smoothed Pseudo Range data cannot bring performance enhancement being transmitted at 10 Hz. However, 1 Hz transmissions are sufficient for the smoothed Pseudo Range data to bring performance enhancement. At the same time, Phase Range data should be transmitted at 10 Hz. Such decimation is possible with proper combinations of MSM1, MSM2, MSM3, and MSM4 which can save throughput dramatically while not leading to any final performance degradations.

Network RTK refers to generating observables corresponding to some Master Reference receiver (physical or computed) plus extra Network information such as MAC/FKP messages and/or Network Residual messages describing spatial errors in vicinity of Master position. These data sets are usually generated by Network software which gets multiple receivers input for Network processing.

Presently, Master Reference data are served by legacy RTCM-3 GPS/GLONASS L1/L2 observation messages. But these messages can be easily substituted by MSM1, MSM2, MSM3 and MSM4 messages. This substitution could additionally provide Network correcting data for L5 and other GNSS signals.

A GNSS receiver internally generates its own observables in its own format (open or unknown). By using the RINEX converter each integrator can record raw data and convert die raw data to RINEX.

With MSM accepted, this scheme can be much simpler. Indeed, a Receiver would just generate a proper MSM stream (e.g. MSM5). This stream can be recorded for future post processing. This operation does not require further conversion to RINEX before post processing because MSM utilizes a standard and post processing software that is transparent: to a receiver capable of generating MSM data.

Alternatively, MSM stream can be forwarded to some real time application running on a separate processor. If this is the case, a positioning engine inside an application will intercept the given MSM stream, decode the data and compute its own position possibly augmented by external GNSS corrections and/or other non GNSS data. This approach is useful for a variety of different GNSS sensors and user software combinations.

In an embodiment of the present technology, the multiple content message (MCM) base apparatus 10 (of FIG. 1) and the multiple content message (MCM) rover apparatus 40 (of FIG. 2) can be used to enable the State Space (SS) correcting services and resulting Precise Point Positioning (PPP) algorithms in a receiver.

State Space (SS) data can augment (or even substitute in many cases) existing Measurement Space (MS) correcting services. SS correcting service requires collecting receiver observables from as many reference stations as possible, ideally spread all over the globe.

International Geodetic Service (IGS) provides SS correcting data (so called precise IGS products) which can be used for post processing applications to get dm/cm level global accuracy without the need of any reference station or reference network. IGS particularly provides a different set of GNSS data via Internet. [0118] SS correcting data is computed (or estimated) by super powerful engines running on super-powerful Internet-enabled servers. These engines process original receiver observables (often corresponding to different manufactures) presented in RINEX format. That is why resulting SS correcting data is suitable only for post processing applications.

The need for real time SS correcting data is obvious nowadays. So called RTCM-3 SSR messages (already standardized for GPS and GLONASS) carry some SS correcting data in real time. Real time SS correcting data is computed (or estimated) by some recurrent engine, e.g. multi-state Kalman filter, with the input in form of original receiver observations coning in real time from multiple reference stations.

In an embodiment of the present technology, a method of multiple content message (MCM) base navigation by using the apparatus 10 (of FIG. 1) comprises the following steps (not shown): (A) obtaining a set of original fast frequency raw data by using the Global Navigation Satellite System (GNSS) sensor 12; (B) processing the set of original fast frequency raw data 14 obtained by the GNSS sensor 12 by using the Position Velocity Time (PVT) Engine 16 configured to generate a set of fast frequency positioning data 20 in an Integrated Velocity (IV) solution format; and (C) processing the set of original fast frequency raw data 14 provided by the GNSS sensor 12 and the set of fast frequency positioning data 20 in said Integrated Velocity (IV) solution format provided by the PVT Engine 16 by using the Composite Message generator 18 to generate a composite base data stream 22 comprising two sets of data; a first set of data including a set of slow frequency observable data, and a second set of data including a set of fast frequency positioning data in the Integrated Velocity (IV) solution format. These two sets of data are packed into a transport layer by using a packing protocol.

In an embodiment of the present technology, a method of multiple content message (MCM) rover apparatus navigation by using the apparatus 40 (of FIG. 2) comprises the following steps (not shown): (A) obtaining a set of original fast frequency raw data by using the Global Navigation Satellite System (GNSS) sensor 42; (B) processing the set of original fast frequency raw data 46 provided by the GNSS sensor 42 by using the Position Velocity Time (PVT) Engine 48 to generate a set of fast frequency positioning data 50 in an Integrated Velocity (IV) solution format; (C) processing the composite base data stream provided 66 by the multiple content message (MCM) base apparatus 10 (of FIG. 1) by using the Composite Message decoder 64 configured to recover a set of slow frequency observable data 54, and a set of fast frequency positioning data 62 in the Integrated Velocity (IV) solution format; (D) processing die set of fast frequency raw data 46 provided by the Global Navigation Satellite System (GNSS) sensor 42 and processing the set of slow frequency observable data 54 provided by the Composite Message decoder 64 by using the Real Time Kinematic (RTK) engine 52 configured to generate a set of slow frequency baseline estimates data 56 with a matched slow frequency of the base data and the slow frequency of the rover raw data; wherein the baseline comprises a line between the multiple signal message (MCM) rover apparatus 41) (of FIG. 2) and the multiple signal message (MCM) base apparatus 10 (of FIG. 1); and (E) combining the set of fast frequency rover data 50 in the Integrated Velocity (IV) solution format provided by the PVT engine 48; the set of slow frequency baseline data 56 provided by the RTK baseline engine 52, and the set of fast frequency positioning data 62 in the Integrated Velocity (IV) solution format provided by the decoder 64 of the base data 66 by using the baseline corrector/combiner 58 to generate the set of fast frequency baseline data 60.

The above discussion has set forth the operation of various exemplary systems and devices, as well as various embodiments pertaining to exemplary methods of operating such systems and devices. In various embodiments, one or more steps of a method of implementation are carried out by a processor under the control of computer-readable and computer-executable instructions. Thus, in some embodiments, these methods are implemented via a computer.

In an embodiment, the computer-readable and computer-executable instructions may reside on computer useable/readable media.

Therefore, one or more operations of various embodiments may be controlled or implemented using computer-executable instructions, such as program modules, being executed by a computer. Generally, program modules include routines, programs, objects, components, data structures, etc., that perform particular tasks or implement particular abstract data types. In addition, the present technology may also be practiced in distributed computing environments where tasks are performed by remote processing devices that are linked through a communications network. In a distributed computing environment, program modules may be located in both local and remote computer-storage media including memory-storage devices.

Although specific steps of exemplary methods of implementation are disclosed herein, these steps are examples of steps that may be performed in accordance with various exemplary embodiments. That is, embodiments disclosed herein are well suited to performing various other steps or variations of the steps recited. Moreover, the steps disclosed herein may be performed in an order different than presented, and not all of the steps are necessarily performed in a particular embodiment.

Although various electronic and software based systems are discussed herein, these systems are merely examples of environments that might be utilized, and are not intended to suggest any limitation as to the scope of use or functionality of the present technology. Neither should such systems be interpreted as having any dependency or relation to any one or combination of components or functions illustrated in the disclosed examples.

Although the subject matter has been described in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A multiple content message (MCM) base apparatus mounted on a platform; said apparatus comprising:

A Global Navigation Satellite System (GNSS) sensor configured to acquire at least one GNSS signal emanating from at least one visible GNSS satellite; wherein said GNSS sensor is configured to provide a set of original fast frequency raw data obtained from said at least one visible GNSS satellite;

a Position Velocity Time (PVT) Engine configured to receive said set of original fast frequency raw data provided by said GNSS sensor; said Position Velocity Time (PVT) Engine configured to generate a set of fast frequency positioning data in an Integrated Velocity (IV) solution format;

and a Composite Message generator configured to receive said set of original fast frequency raw data provided by said GNSS sensor, and configured to receive said set of fast frequency positioning data in said Integrated Velocity (IV) solution format provided by said PVT Engine; said Composite message generator configured to generate a composite base data stream comprising a first set of data and a second set of data; said first set of data including a set of slow frequency observable data, and said second set of data including a set of fast frequency positioning data in said Integrated Velocity (IV) solution format; said two sets of data being packed into a transport layer by using a packing protocol.

2. The apparatus of claim 1, said apparatus mounted on said platform, said platform being selected from the group consisting of:

a mobile platform; and a stationary platform.

3. The apparatus of claim 1, wherein said Global Navigation Satellite System (GNSS) sensor is selected from the group consisting of:
a single GNSS sensor; a combination of two GNSS sensors; a combination of three GNSS sensors; a combination of four GNSS sensors; a combination of five GNSS sensors; and a combination of six GNSS sensors; wherein at least one said GNSS sensor is selected from the group consisting of:
a GPS sensor; a GLONASS sensors; a Galileo sensor; a BEIDOU sensor; a QZSS sensor; and a SBAS sensor.

4. The apparatus of claim 1, wherein said Position Velocity Time (PVT) Engine is selected from the group consisting of:
a standalone Position Velocity Time (PVT) Engine; and a differential Position Velocity Time (PVT) Engine.

5. The apparatus of claim 4, wherein said differential Position Velocity Time (PVT) Engine is selected from the group consisting of:
A Measurement Space Corrected (MSC) Engine; and a State Space Corrected (SSC) Engine.

6. The apparatus of claim 1, wherein said Position Velocity Time (PVT) Engine employs a base navigation algorithm selected from the group consisting of:
a real time base navigation algorithm; and a post-processing base navigation algorithm.

7. The apparatus of claim 1, wherein said Composite Message generator employs said packing protocol selected for the group consisting of
a Radio Technical Commission for Maritime Services (RTCM) protocol; a Compact Measurement Record (CMR) protocol; and an AshTech Optimized Messaging (ATOM) protocol.

8. A multiple content message (MCM) rover apparatus mounted on a platform; said apparatus comprising:
a Global Navigation Satellite System (GNSS) sensor configured to acquire at least one GNSS signal emanating from at least one visible GNSS satellite; wherein said GNSS sensor is configured to provide a set of original fast frequency raw data obtained from said at least one visible GNSS satellite;
a Position Velocity Time (PVT) Engine configured to receive said set of original fast frequency raw data provided by said GNSS sensor; said Position Velocity Time (PVT) Engine configured to generate a set of fast frequency positioning data in an Integrated Velocity (IV) solution format;
a Composite Message decoder configured to receive from a multiple content message (MCM) base apparatus a composite base data stream and configured to recover from said received composite base data stream a set of slow frequency observable data, and a set of fast frequency positioning data in said Integrated Velocity (IV) solution format;
a Real Time Kinematic (RTK) engine configured to receive said set of fast frequency raw data provided by said Global Navigation Satellite System (GNSS) sensor; configured to receive said set of slow frequency observable data provided by said Composite Message decoder; and configured to generate a set of slow frequency baseline estimates data with a matched slow frequency of said base data and said slow frequency of said rover raw data; said baseline comprising a line between said multiple signal message (MCM) rover apparatus and a multiple signal message (MCM) base apparatus;
and
a baseline corrector/combiner configured to combine said set of fast frequency rover data in said Integrated Velocity (IV) solution format provided by said PVT engine; said set of slow frequency baseline data provided by said RTK baseline engine, and said set of fast frequency positioning data in said Integrated Velocity (IV) solution format provided by said decoder of said base data; said baseline corrector/combiner configured to generate a set of fast frequency baseline data.

9. The apparatus of claim 8, said apparatus mounted on said platform, said platform being selected from the group consisting of:
a mobile platform; and a stationary platform.

10. The apparatus of claim 8, wherein said Global Navigation Satellite System (GNSS) sensor is selected from the group consisting of:
a single GNSS sensor; a combination of two GNSS sensors; a combination of three GNSS sensors; a combination of four GNSS sensors; a combination of five GNSS sensors; and a combination of six GNSS sensors; wherein at least one said GNSS sensor is selected from the group consisting of:
a GPS sensor; a GLONASS sensors; a Galileo sensor; a BEIDOU sensor; a QZSS sensor; and a SBAS sensor.

11. The apparatus of claim 8, wherein said Position Velocity Time (PVT) Engine is selected from the group consisting of:
a standalone Position Velocity Time (PVT) Engine; and a differential Position Velocity Time (PVT) Engine.

12. The apparatus of claim 11, wherein said differential Position Velocity Time (PVT) Engine is selected from the group consisting of:
A MSC (Measurement Space Corrected) Engine; and a State Space Corrected (SSC) Engine.

13. The apparatus of claim 8, wherein said Position Velocity Time (PVT) Engine employs a navigation rover algorithm selected from the group consisting of:
a real time rover navigation algorithm; and a post-processing rover navigation algorithm.

14. The apparatus of claim 8, wherein said Real Time Kinematic (RTK) engine further comprises:
a high latency Real Time Kinematic (RTK) engine configured to compute a slow frequency baseline estimates with a high latency.

15. A method of multiple content message (MCM) base navigation comprising:
(A) obtaining a set of original fast frequency raw data by using a Global Navigation Satellite System (GNSS) sensor; said set of original fast frequency raw data emanating from at least one visible GNSS satellite;
(B) processing said set of original fast frequency raw data obtained by said GNSS sensor by using a Position Velocity Time (PVT) Engine to generate a set of fast frequency positioning data in an Integrated Velocity (IV) solution format;
and
(C) processing said set of original fast frequency raw data provided by said GNSS sensor and said set of fast frequency positioning data in said Integrated Velocity (IV) solution format provided by said PVT Engine by using a Composite Message generator to generate a composite base data stream comprising two sets of data; a first set of data including a set of slow frequency observable data, and a second set of data including a set of fast frequency positioning data in said Integrated Velocity (IV) solution format; said two sets of data being packed into a transport layer by using a packing protocol.

16. The method of claim 15, wherein said step (A) further comprises:
  (A1) selecting said Global Navigation Satellite System (GNSS) sensor from the group consisting of:
  a single GNSS sensor; a combination of two GNSS sensors; a combination of three GNSS sensors; a combination of four GNSS sensors; a combination of five GNSS sensors; and a combination of six GNSS sensors.

17. The method of claim 15, wherein said step (A) further comprises:
  (A2) selecting said Global Navigation Satellite System (GNSS) sensor from the group consisting of:
  a GPS sensor; a GLONASS sensors; a Galileo sensor; a BEIDOU sensor; a QZSS sensor; and a SBAS sensor.

18. The method of claim 15, wherein said step (B) further comprises:
  (B1) selecting said Position Velocity Time (PVT) Engine from the group consisting of:
  a standalone Position Velocity Time (PVT) Engine; and a differential Position Velocity Time (PVT) Engine.

19. The method of claim 18, wherein said step (B1) further comprises:
  (B1, 1) selecting said differential Position Velocity Time (PVT) Engine from the group consisting of:
  A Measurement Space Corrected (MSC) Engine; and a State Space Corrected (SSC) Engine.

20. The method of claim 15, wherein said Position Velocity Time (PVT) Engine employs a base navigation algorithm; and wherein said step (B) further comprises:
  (B2) selecting said base navigation algorithm from the group consisting of:
  a real time base navigation algorithm; and a post-processing base navigation algorithm.

21. The method of claim 15, wherein said step (C) further comprises:
  (C1) selecting said packing protocol employed by said Composite message generator from the group consisting of a Radio Technical Commission for Maritime Services (RTCM) protocol; a Compact Measurement Record (CMR) protocol; and an AshTech Optimized Messaging (ATOM) protocol.

22. A method of multiple content message (MCM) rover apparatus navigation comprising:
  (A) obtaining a set of original fast frequency raw data by using a Global Navigation Satellite System (GNSS) sensor; said set of original fast frequency raw data emanating from at least one visible GNSS satellite;
  (B) processing said set of original fast frequency raw data provided by said GNSS sensor by using a Position Velocity Time (PVT) Engine to generate a set of fast frequency positioning data in an Integrated Velocity (IV) solution format;
  (C) processing a composite base data stream provided by a multiple content message (MCM) base apparatus by using a Composite Message decoder to recover a set of slow frequency observable data, and a set of fast frequency positioning data in said Integrated Velocity (IV) solution format;
  (D) processing said set of fast frequency raw data provided by said Global Navigation Satellite System (GNSS) sensor and processing said set of slow frequency observable data provided by said Composite Message decoder by using a Real Time Kinematic (RTK) engine to generate a set of slow frequency baseline estimates data with a matched slow frequency of said base data and said slow frequency of said rover raw data; said baseline comprising a line between a multiple signal message (MCM) rover apparatus and a multiple signal message (MCM) base apparatus;
  and
  (E) combining said set of fast frequency rover data in said Integrated Velocity (IV) solution format provided by said PVT engine; said set of slow frequency baseline data provided by said RTK baseline engine, and said set of fast frequency positioning data in said Integrated Velocity (IV) solution format provided by said decoder of said base data by using a baseline corrector/combiner to generate a set of fast frequency baseline data.

* * * * *